United States Patent
Andre et al.

(10) Patent No.: US 6,880,882 B2
(45) Date of Patent: Apr. 19, 2005

(54) SUPPORT FOR MOTOR VEHICLE BODYWORK ELEMENTS, AN EQUIPMENT FRONT FACE DIVIDED INTO TWO PARTS, AND A MOTOR VEHICLE FRONT BLOCK DIVIDED INTO TWO MODULES

(75) Inventors: Gerald Andre, Amberieu en Bugey (FR); Hugues Cheron, Meximieux (FR); Arnold Fayt, Jujurieux (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/409,444

(22) Filed: Apr. 9, 2003

(65) Prior Publication Data

US 2004/0080183 A1 Apr. 29, 2004

(30) Foreign Application Priority Data

Apr. 9, 2002 (FR) .......................................... 02 04426

(51) Int. Cl.⁷ .............................................. B60R 27/00
(52) U.S. Cl. ............................ 296/193.09; 296/187.09; 296/203.02; 293/115
(58) Field of Search ..................... 296/193.09, 187.04, 296/187.09, 193.1, 193.11, 203.02; 293/115

(56) References Cited

U.S. PATENT DOCUMENTS

| | | | | |
|---|---|---|---|---|
| 3,893,207 A | * | 7/1975 | Rudaitis et al. .......... | 180/69.21 |
| 3,926,463 A | * | 12/1975 | Landwehr et al. ..... | 296/187.09 |
| 5,658,041 A | * | 8/1997 | Girardot et al. ........ | 296/193.09 |
| 6,196,624 B1 | * | 3/2001 | Bierjon et al. ......... | 296/193.09 |
| 6,357,821 B1 | * | 3/2002 | Maj et al. .............. | 296/203.02 |
| 6,450,276 B1 | * | 9/2002 | Latcau ................... | 296/203.02 |
| 6,523,886 B1 | * | 2/2003 | Hoffner et al. ......... | 296/203.02 |
| 6,540,284 B1 | * | 4/2003 | Miyata ................... | 296/203.02 |
| 6,685,258 B1 | * | 2/2004 | Brogly et al. .......... | 296/203.02 |
| 2001/0010275 A1 | * | 8/2001 | Sasano et al. ......... | 296/203.02 |

FOREIGN PATENT DOCUMENTS

| | | |
|---|---|---|
| DE | 199 11 832 A1 | 9/1999 |
| EP | 1 036 730 A2 | 9/2000 |

* cited by examiner

*Primary Examiner*—Lori L. Coletta
(74) *Attorney, Agent, or Firm*—Oliff & Berridge, PLC (57) ABSTRACT

The invention relates to a support for bodywork elements, the support comprising means for receiving and fastening optical elements, fastener members for bodywork elements, docking zones for receiving the edges of bodywork elements and for putting them into position relative to the adjacent edges of bodywork elements and optical elements, and means for positioning and fixing a hood lock. The invention also provides an equipment front face in two portions, namely a structural portion and a geometrical portion, together with a motor vehicle front block divided into two modules, namely a structural module integrating various functional members of the vehicle, and a geometrical module integrating the bodywork elements for the front of the vehicle.

18 Claims, 8 Drawing Sheets

SUPPORT FOR MOTOR VEHICLE BODYWORK ELEMENTS, AN EQUIPMENT FRONT FACE DIVIDED INTO TWO PARTS, AND A MOTOR VEHICLE FRONT BLOCK DIVIDED INTO TWO MODULES

The present invention relates to a support for motor vehicle bodywork elements, to an equipment front face, and to a motor vehicle front block.

BACKGROUND OF THE INVENTION

Equipment front faces are known that are rigid structural parts serving to unite various functional members of a vehicle, such as, for example: a radiator, tanks, and light units. Such a structural part constitutes an assembly that is prepared in advance for fitting as a single block on the vehicle assembly line.

This reduces the length of the vehicle assembly line by avoiding the need to install the functional members at the front of the vehicle one by one.

However, bodywork elements continue to be installed in traditional manner, since after putting the equipment front face into place, it is necessary to bring in separately the shield, the grille, and possibly also other bodywork elements, for applying to the front block of the vehicle.

Such traditional assembly of bodywork elements raises well-known difficulties of ensuring that adjacent bodywork elements are properly positioned relative to one another, and also that light units are properly positioned relative to bodywork elements, in particular given the expansions to which they are subject while the vehicle is in use.

OBJECTS AND SUMMARY OF THE INVENTION

The present invention seeks to propose a technical solution enabling the conditions under which bodywork elements are assembled on a vehicle to be improved, while nevertheless retaining the advantages associated with prior assembly of functional members on an equipment front face.

Another object of the present invention is to make it possible to use bodywork elements having walls that are remarkably fine, thus making them lightweight and low cost.

The present invention firstly provides a support for bodywork elements, the support comprising:

means for receiving and fixing optical elements;
members for fixing to bodywork elements; and
docking zones for receiving the edges of bodywork elements and for positioning them relative to the edges of adjacent bodywork elements and optical elements.

In accordance with the invention, the optical elements may be optical glasses, complete light units, or overglasses, i.e. glasses placed in front of light units that already have their own front glasses.

The function of the support of the invention is to unite and preposition the various bodywork elements situated at the front of the vehicle, i.e. in general the bumper, the optical elements, and the grille, and to ensure that they are held together while they are being assembled on the vehicle, and then subsequently while said vehicle is in use.

The invention makes it possible in particular to assemble optical elements and bodywork elements simultaneously on the vehicle so as to constitute the front block, thereby both reducing vehicle assembly time and improving the positioning of the various bodywork elements and optical elements relative to one another.

One of the advantages of the invention is that the bodywork elements carried by the support may present very fine thickness, thereby reducing the overall weight of the parts assembled on said support.

By means of the support of the invention, it is possible to handle bodywork elements that are not very rigid and to assemble them without difficulty on the vehicle.

In a particular embodiment, the support comprises prop members for supporting bodywork elements in order to compensate for the lack of rigidity of the bodywork elements and to avoid deformation that is undesirable from the point of view of appearance, even though without consequence, structurally speaking.

Another advantage associated with the fact that thin bodywork elements can be fixed on the support is that said bodywork elements held by their edges are forced to expand within their volume, without peripheral expansion, thereby guaranteeing that their positioning relative to one another is properly conserved.

It will thus be understood that the function of the prop members relative to the bodywork elements is purely for reasons of appearance and non-structural, the structure of the vehicle being neither reinforced nor degraded by the presence or absence of such prop members.

In a particular embodiment of the invention, the docking zones acting on the bodywork elements carried by the support in particular to dock them with the surrounding bodywork elements, are constituted by fender/shield pressers of well-known structure, and the docking zones acting between bodywork elements and optical elements carried by the support are constituted by grille/shield fixing and by supporting the top area of the shield.

In a particular embodiment of the invention, the support for the bodywork elements further comprises means for positioning and fixing a hood lock.

The present invention also provides an equipment front face divided into two portions, namely a structural portion receiving functional members of the vehicle, and a geometrical portion constituted by a support as described above.

The structural portion and the geometrical portion are shaped so as to be easy to assemble together, preferably in the longitudinal direction of the vehicle.

Since there is no direct connection with the bodywork elements of the vehicle, the structural portion of the equipment front face does not need to be positioned very precisely relative to the bodywork elements, which makes it easier to assemble on the vehicle.

In other words, the equipment front face of the invention provides a distinction between functional portions which can be positioned with a certain amount of inaccuracy, and bodywork and optical elements which need to be positioned very precisely relative to one another, both those carried by the geometrical portion and those carried by the remainder of the vehicle, around the front block.

Because of this distinction, the invention conserves the principle of the equipment front face as a set of parts that can be prepared in advance and off the vehicle assembly line, with this principle applying equally well to the functional members and to the vehicle bodywork elements.

In addition, the order and the manner in which one or the other portion of the equipment front face is prepared has no effect on vehicle assembly. In particular, the structural portion of the equipment front face need not be prepared in advance, but can be assembled directly on the vehicle prior to putting the geometrical portion into place.

The invention also provides a method of assembling parts on a motor vehicle equipment front face as described above, where the direction X indicates the longitudinal horizontal direction of the vehicle, the direction Y indicates the transverse horizontal direction of the vehicle, and the direction Z indicates the vertical direction, which method comprises the following steps:

- fixing the structural portion to the structure of the vehicle without accurate positioning in the directions X and Y, but while ensuring accurate geometrical positioning of the bodywork in the direction Z, such as the ends of the side reinforcements of the scuttle or of the fender, if already present on the body of the vehicle when the structural portion is assembled thereto; and
- subsequently placing the geometrical portion by resting it vertically on the structural portion which imposes thereon its own positioning in the direction Z, the geometrical portion being positioned in the directions X and Y relative to a geometrical reference of the bodywork, such as said fender ends, for example.

In the embodiment where the support for bodywork elements has means for positioning and fixing a hood lock, the hook lock is initially fixed to the geometrical portion of the equipment front face by being placed at exactly the desired distance from the optical glass on the support.

While positioning the geometrical portion on the structural portion of the equipment front face, the lock has its Z position determined by the structural portion, while it conserves its X and Y positions on the support, and the support is itself positioned in the directions X and Y by the bodywork geometrical references supplied by the vehicle. The lock is thus properly positioned in all three directions X, Y, and Z.

Proper centering of the hood relative to the bodywork elements is thus guaranteed, since this centering stems directly from the position of the lock.

In a particular embodiment of the invention, the structural portion of the equipment front face is arranged so as to be fixed on the body of the vehicle, at the ends of two side rails.

In a particular embodiment, the geometrical portion is fixed to the body via the reinforcement ends of scuttle sides and by re-fixing the lock on the structural portion in the Z direction.

In a particular variant, the geometrical portion and the structural portion have section members in the vicinity of the lock which, on being assembled together, form a hollow body that stiffens the equipment front face in the region where the lock is fixed.

According to other advantageous characteristics of the invention:

- the geometrical portion of the equipment front face has an appearance cross-member which masks a structural cross-member under the hood;
- the geometrical portion has elements for dealing with impacts against pedestrians, i.e. top reinforcement for acting as a bearing point for the shield in order to deal with "hip" impacts against pedestrians (or "child's head" impacts) and to provide support for the buttocks, and/or a honeycomb type impact absorber at impact beam height in order to deal with "leg" impacts and/or a low-portion beam;
- the structural portion may equally well be assembled on the vehicle at the same time as the engine and transmission unit to which it has already been fixed, or after the engine and transmission unit is assembled to the vehicle;
- while assembling the geometrical portion on the vehicle, not only do the bodywork elements carried by the support remain properly positioned relative to one another and relative to the optical glass, but, in addition, the vehicle fenders become connected via the docking zones of the support to the edges of the bodywork elements carried by the support so as to become accurately positioned relative thereto, the end of each fender being held and re-shaped by the support so as to become exactly flush with the optical glass and/or the bodywork elements carried by the support;
- the structural portion supports various functional members of the vehicle such as, for example: its radiator, various tanks, one or more converging members, an impact cross-member;
- the structural portion carries a bottom flange which is fitted to the vehicle at the same time as the other parts carried by the structural portion;
- the structural portion has additional equipment supports, such as supports for batteries, air filters, engine integration units, computers; and
- the equipment front face supports two hood locks each situated at the top end of a vertical leg fixed to one end of a side rail and constituting, with the other leg fixed to the other side rail, the only parts forming the structural portion of the equipment front face of the invention. Under such circumstances, the forces that arise from the hood being slammed shut or pulled open are transmitted directly from the locks to the side rails via the legs and no central cross-member is required.

The present invention also provides a motor vehicle front block divided into two modules, namely a structural module combining various functional members of the vehicle and a geometrical module combining the bodywork elements for the front of the vehicle.

BRIEF DESCRIPTION OF THE DRAWINGS

To make the invention easier to understand, there follows a description of embodiments provided with the help of non-limiting examples, illustrated by the accompanying drawings, in which.

MORE DETAILED DESCRIPTION

Figure 1:
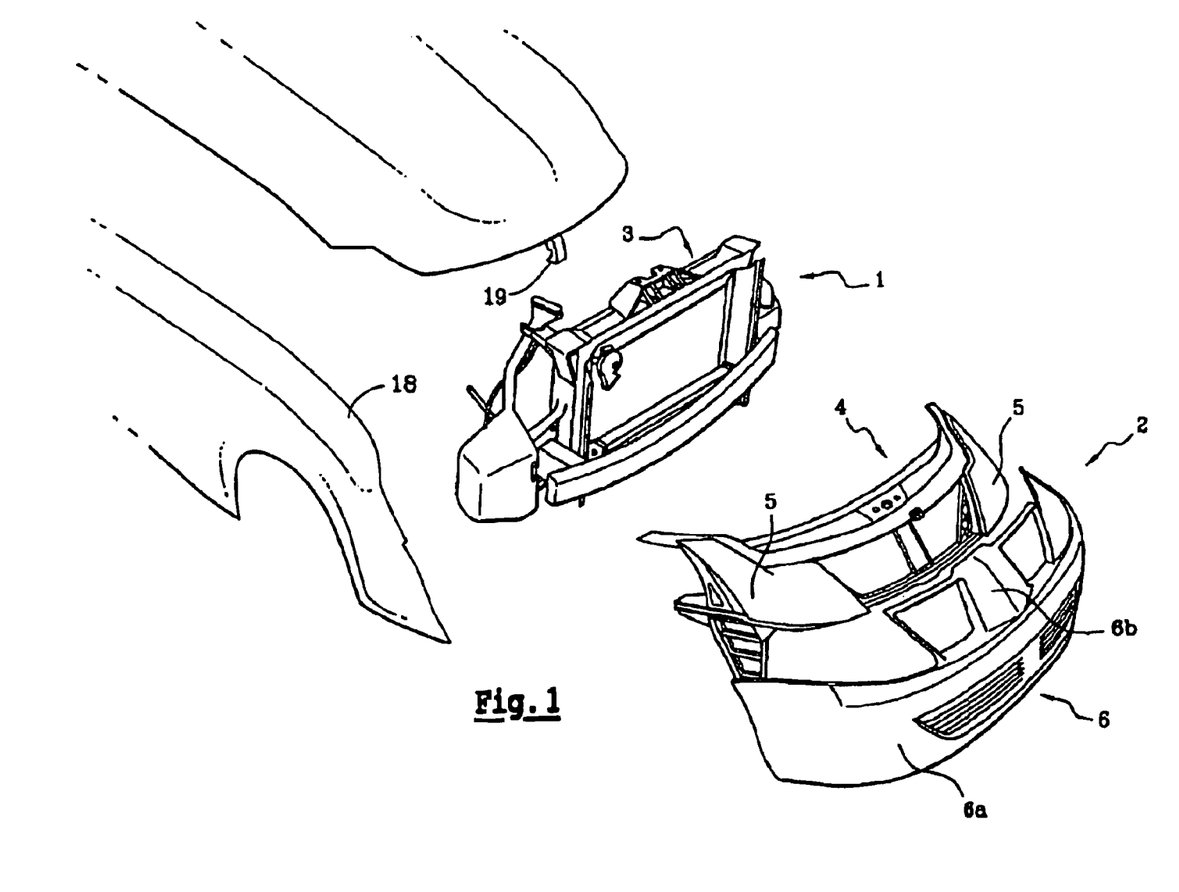
FIG. 1 is a partially-exploded perspective view of a motor vehicle front block.

In accordance with the invention, the front block shown in FIG. 1 comprises a structural module 1 and a geometrical module 2.

The structural module 1 is constituted by a structural portion 3 of an equipment front face and by various functional members of the vehicle assembled on said structural portion.

The geometrical module is constituted by a geometrical portion 4 of the same equipment front face, by two optical glasses 5, and by a shield 6 fitted to said geometrical portion.

The shield 6 comprises a bottom portion 6a constituting a bumper skin provided with two end overriders 16 and a top portion 6b constituting a grille.

The portions 6a and 6b are shaped and arranged in such a manner that each optical glass 5 occupies the corner formed by the bumper skin and the grille.

In other words, each optical glass is bordered downwardly by the skin of the shield, and laterally on the inside by the grille.

Figure 2:
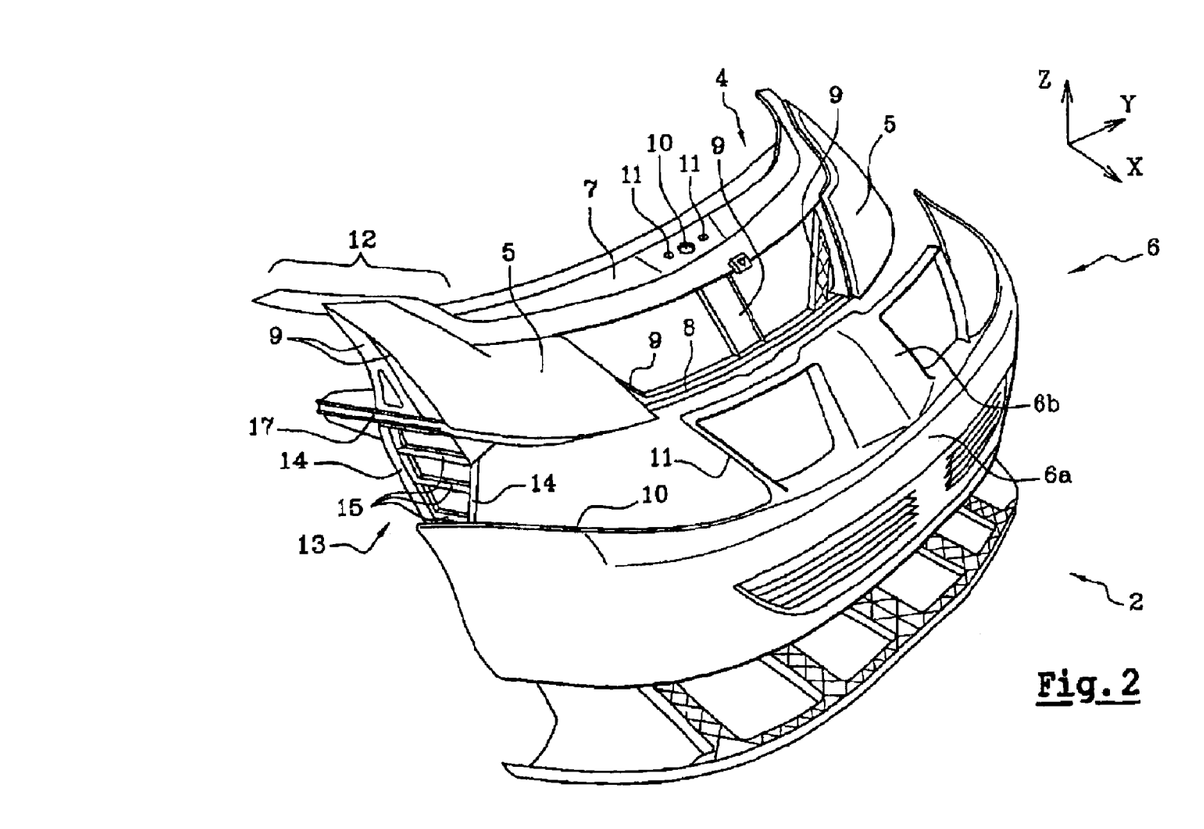
FIG. 2 is a perspective view of the geometrical module of the FIG. 1 front block carrying a slightly modified shield.

In addition, in the example of FIG. 2, a reinforced under-engine ski is added to the shield.

As can be seen more clearly in FIG. 2, the geometrical portion comprises a top cross-member 7 which extends horizontally from one side of the vehicle to the other, and a bottom edge 8 that is substantially parallel to the cross-member 7, and united thereto by substantially vertical uprights 9.

The cross-member 7 and the bottom edge 8 are curved at their ends towards the rear of the vehicle, so that they include end portions 12 extending substantially in the longitudinal direction of the vehicle.

In these end portions 12, a structure 13 extends downwards from the bottom edge 8, being constituted by two substantially-vertical uprights 14 united by horizontal bars 15. This structure 13 presents a certain amount of stiffness.

Each optical glass 5 is housed in a compartment defined by the cross-member 7, the bottom edge 8, and two of the vertical uprights 9.

Each optical glass is fixed to the geometrical portion by conventional means (not shown).

In its central portion, the cross-member 7 has a through passage 10 and two fixing orifices 11. In the example shown, the passage 10 is situated exactly in the middle of the cross-member 7, both in the longitudinal direction X and in the transverse direction Y.

The through passage 10 and the fixing orifices 11 are for receiving a hood lock (not shown) which is thus positioned very accurately in the directions X, Y, and Z relative to the optical glasses 5 and to the shield 6.

The bottom edge 8 adjacent to the two optical glasses 5 is also shaped forwardly so as to provide a prop for holding the shield 6 flush with each glass 5.

Each overrider 16 of the bumper skin 6a extends as far as the corresponding rigid structure 13, which acts as a reinforcing back plate preventing the shield from flapping sideways.

Finally, the bottom edge 8 is provided in each of its two end portions 12 with a connecting bridge 17 between the fender 18 and the front block, which bridge serves to force the fender 18 to take up exactly the shape of the geometrical module so as to be accurately positioned relative to the optical glasses 5 and to the shield 6.

The bridge, which is not shown in detail in the drawing, is arranged to preserve the fender in the event of the bumper being severely deformed, by means of a mechanism which releases the fender from the bumper if the bumper comes back a long way.

As can be seen from the above explanation, the optical glasses and the shield are assembled to the geometrical portion 4 off the vehicle assembly line. Once this assembly has been done, the optical glasses and the shield are accurately positioned relative to one another. In addition, because of the connecting bridges between the fender and the front block, the fender is guaranteed to be positioned relative to the optical glass.

Figures 3, 4:
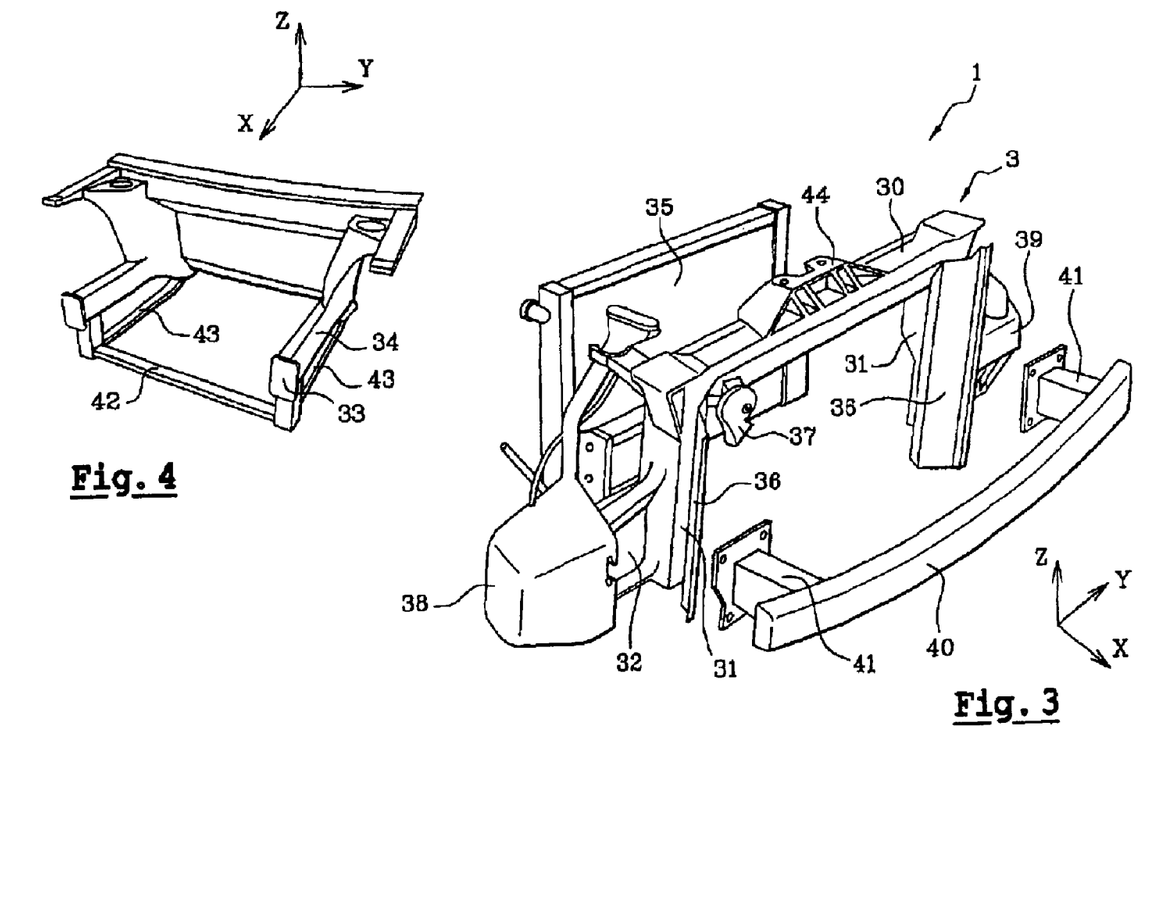
FIG. 3 is a perspective view of the structural module of FIG. 1.
FIG. 4 is a perspective view of the front of the structure of a motor vehicle receiving the FIG. 1 front block.

With reference now to FIG. 3, there follows a description of the structural module of the front block of FIG. 1.

This module is formed by the structural portion 3 of the equipment front face, which portion is constituted in this case by a top horizontal cross-member 30 and by two vertical side legs 31 having plates 32 formed thereon for fixing to the ends 33 of side rails 34 of a vehicle.

In the example shown in FIG. 3, a radiator 35 is received inside the structural portion, i.e. between the two side legs 31 and the top cross-member 30. In addition, each leg 31 supports a lateral converging portion 36, and one of the legs carries a horn 37 and a tank 38, while the other leg carries a degassing jar 39.

An impact beam 40 mounted at its ends on impact absorbers 41 is added to the front of the functional portion 3, being fixed to the fixing plates 32.

In the example shown, the structure (FIG. 4) receiving the functional module has a bottom beam 42 on its bottom flange 43.

The top cross-member 30 is provided with a plate 44 formed integrally therewith for holding the hood lock 19 in the direction Z. The hood lock 19 is held in this way solely for the purpose of withstanding any tearing open or slamming shut forces to which the hood lock is subjected, i.e. forces acting along the vertical direction Z, and it does not in any way change the X and Y positioning which is determined by the geometrical portion.

Figures 5, 6:
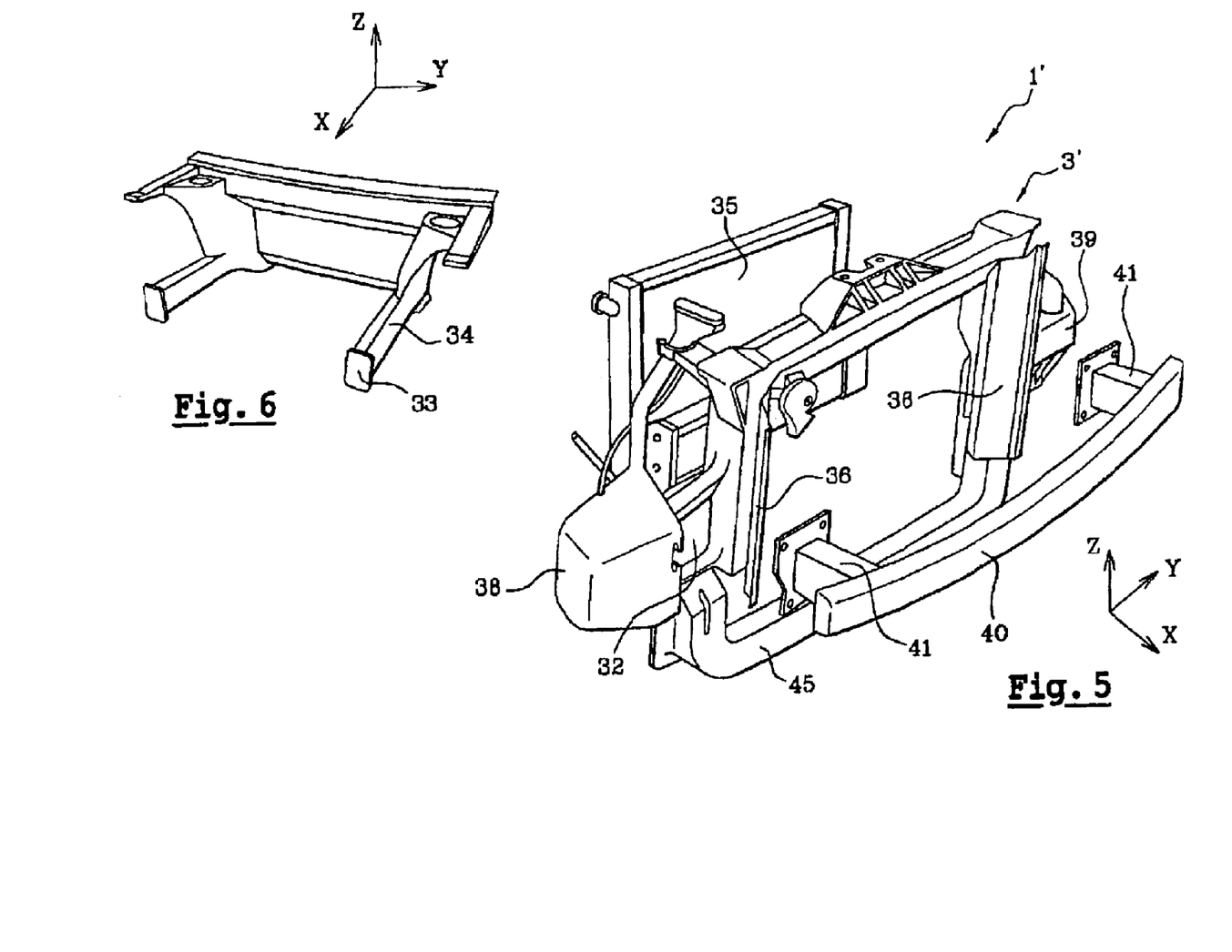
FIGS. 5 and 6 are views analogous respectively to FIGS. 3 and 4 showing another embodiment of the front block.

In the embodiment of FIG. 5, the same functional members are to be found fitted to the structural portion 3' of the equipment front face. However, the structure of the vehicle (see FIG. 6) does not have a bottom flange, and a "bottom flange" cross-member 45 is added to the structural portion of the equipment front face by being fixed to the faces of the fixing plates 32 that face towards the inside of the vehicle.

Figure 7:
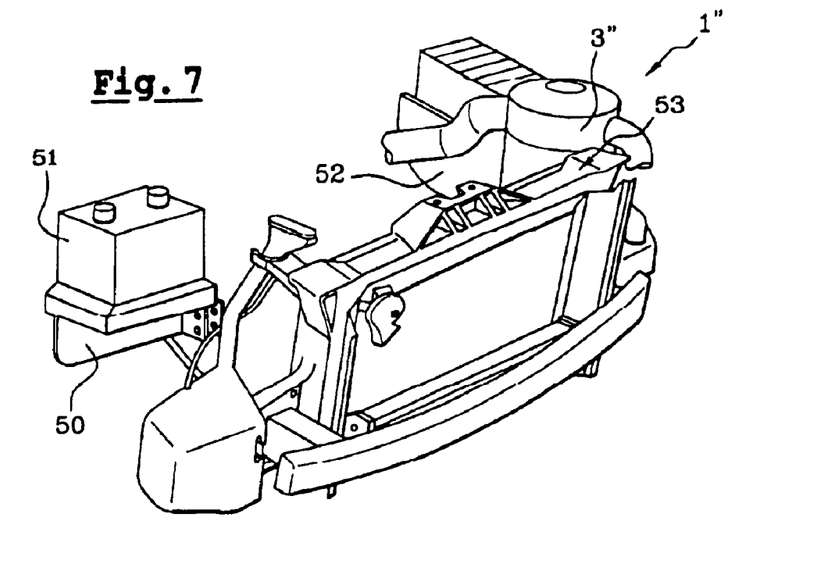
FIG. 7 is a view analogous to FIG. 3 showing another embodiment.

FIG. 7 shows another embodiment, corresponding substantially to FIG. 3, but in which additional equipment is provided on the structural portion 3 of the front block: a support 50 for a battery 51 is fixed to one of the legs 31; and a support 52 for an air filter 53 is fixed to the other leg.

It should be observed that each of the supports 50 and 52 has no need to be dimensioned so as to be capable on its own of withstanding the stresses that result from the presence of the equipment it supports while the vehicle is in use. All that is required is that said support is capable of supporting the equipment while the structural module is being assembled on the vehicle. During such assembly, other fastenings can connect said support directly to the body of the vehicle in such a manner as to reinforce it for when the vehicle is in use.

Figure 8:
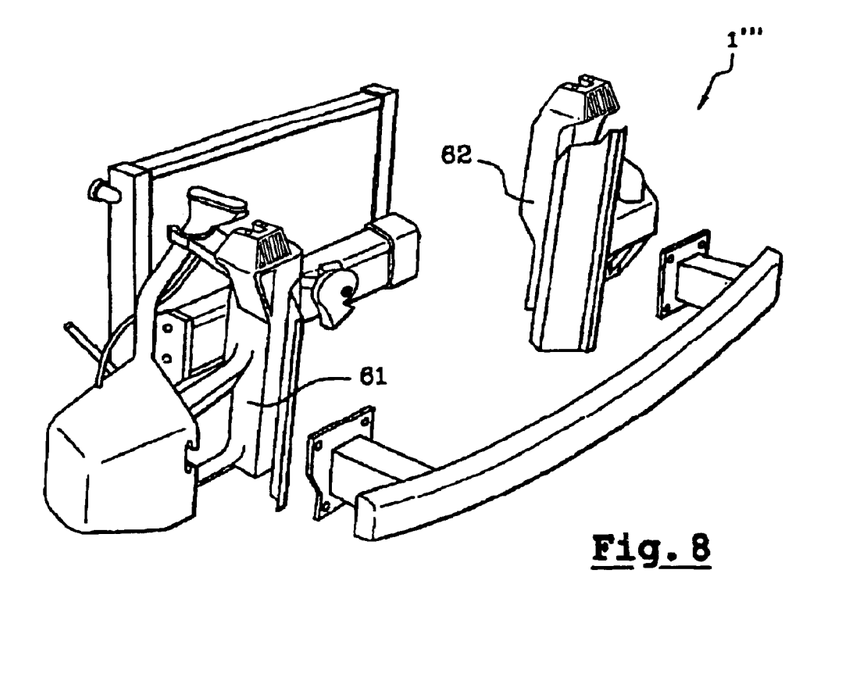
FIG. 8 is a view analogous to FIG. 3 showing another embodiment.

In the embodiment of FIG. 8, the structural portion 1''' of the equipment front face is constituted by no more than two legs 61 and 62, the top cross-member being omitted. In this variant, the engine hood is closed by two locks (not shown), each fixed to the top portion of a corresponding leg (after being positioned in the directions X and Y by the geometrical portion).

Figure 9:
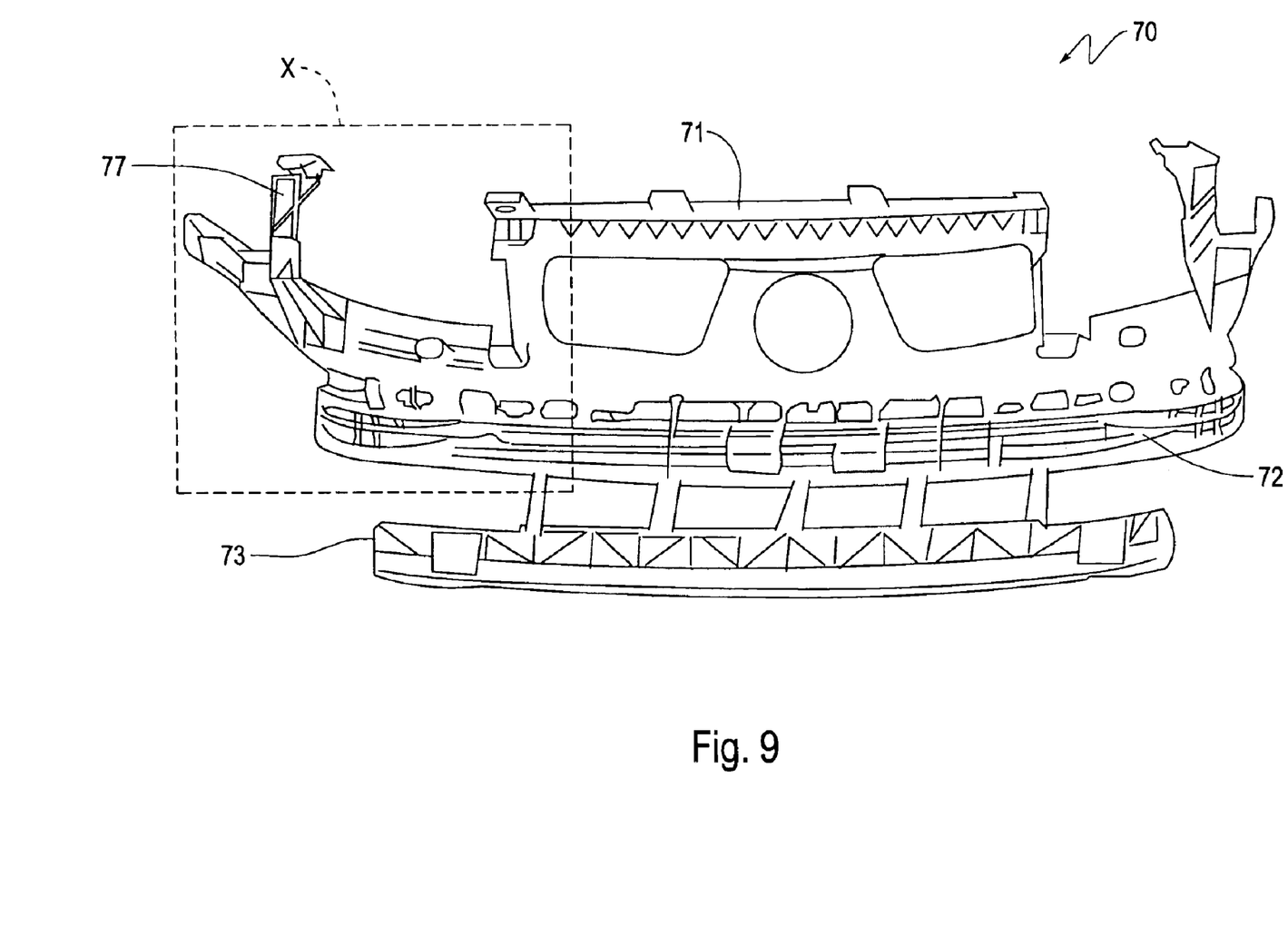
FIG. 9 is a perspective view showing the rear of a geometrical module constituting another embodiment of the invention.

In the embodiment of FIG. 9, the geometrical module 70 is functionally identical to that of FIGS. 1 and 2, but it further comprises firstly a top strength member 71 which props up the skin of the shield 6 at the level of a pedestrian's thigh or femur (not shown) in the event of the front of the vehicle striking a pedestrian in an accident. This top strength member 71 cannot be considered as being structural in the sense that it has no influence on the structure of the vehicle and has no influence on high energy impacts of the kind likely to damage the structure of the vehicle, but is restricted solely to dealing with pedestrian impacts.

In addition, the geometrical module 70 includes an impact absorber 72 level with the impact beam, and also a low beam 73 which may integrate an under-engine reinforcing bar or "ski", like that of the shield of FIG. 2.

In combination, these three elements 71, 72, and 73 enable the leg of an adult pedestrian to be supported at tibia, knee, and hip levels, thereby avoiding excessive break angles. The skin of the shield which covers the geometrical module directly is propped up in these three locations so as to be capable of absorbing leg impact energy where such impacts are of no consequence for the structure of the vehicle.

Figure 10:
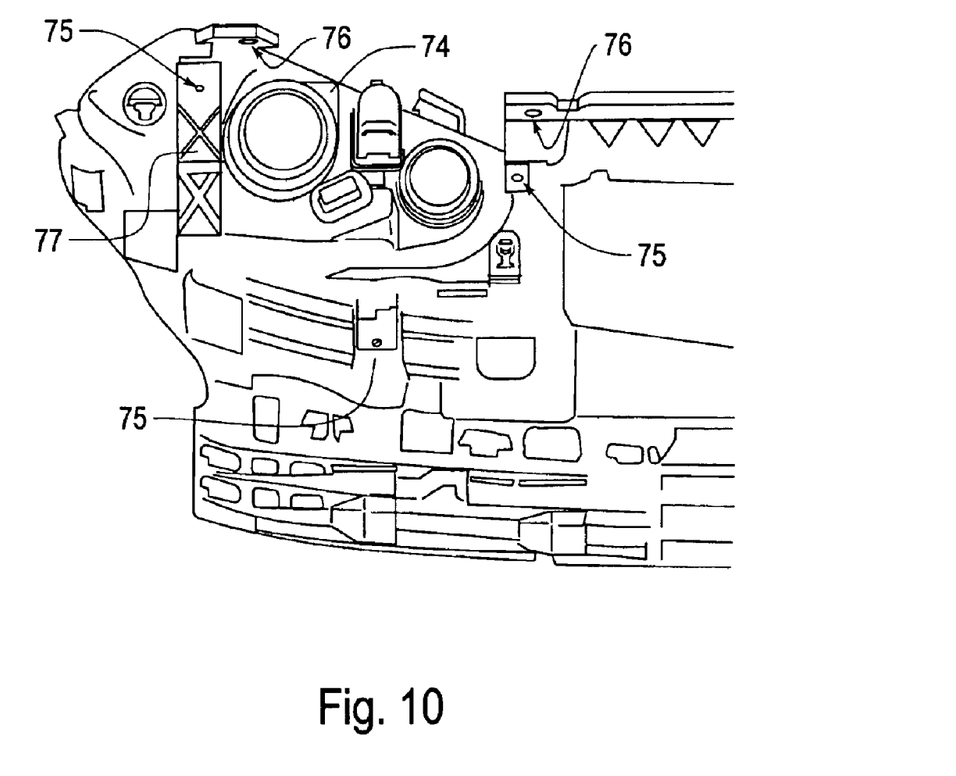
FIG. 10 is a view of detail X in FIG. 9 after a light unit has been positioned on the geometrical module.

FIG. 10 shows the detail X of FIG. 9, in which it can be seen more clearly how the light unit 74 is positioned on the geometrical module, and also how it is positioned relative to the shield.

Fasteners 75 hold the light unit to the geometrical module, and other fasteners 76 are provided for fastening the geometrical module to the structural portion of the equipment front face. The light unit 74 is supported securely by a cradle formed in particular by a strap 77 defining the bottom of its housing for receiving the light unit.

The fasteners 75 are advantageously fusible, thus enabling them to deal with lateral pedestrian impacts by releasing the light units which can thus retract against an impact from a pedestrian's hip.

As mentioned above, various functional members are fitted to the legs forming the structural portion of the equipment front face.

Figure 11:
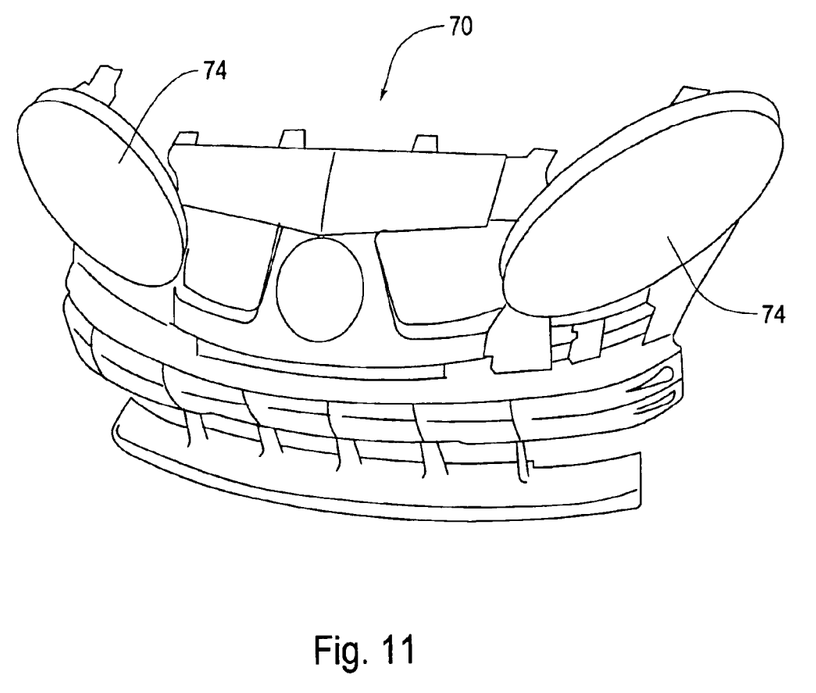
FIG. 11 is a view of the front of the same geometrical module after two light units have been positioned.

FIG. 11 shows two light units mounted on the geometrical module and thus properly positioned relative to the shield and to the other surrounding pieces of bodywork.

Two assembly scenarios are possible for the structural and geometrical modules of FIGS. 1 to 9:

either the structural module is assembled together with the engine and transmission unit. In which case, the cooling circuit which includes the radiator is connected to the vehicle engine and the structural module rests on an engine cradle. The assembly constituted by the engine and the structural module is brought to the vehicle. The vertical position Z of the structural module is adjusted relative to a geometrical reference of the bodywork, which reference may be provided by the reinforcing ends of the scuttle sides. Finally, the module is fixed on the body, at the ends of the two side rails;

or else the structural module is mounted after the engine and transmission unit. In which case, the structural module, which incorporates the radiator, is brought to the vehicle and then the cooling circuit is connected to the engine, preferably using quick couplings. The vertical position Z of the structural module is then adjusted relative to a geometrical reference of the bodywork which may be provided by the reinforcing ends of the scuttle sides, and then the structural module is fixed to the body of the vehicle, at the ends of the two side rails.

Thereafter, the geometrical module of the front block is mounted on the functional module.

The geometrical module is positioned on the vehicle by bearing vertically in the direction Z on the structural module which is already in place, while it is positioned in the directions X and Y by geometrical reference to the bodywork, for example by pressing against the ends of the scuttle side reinforcements.

The connection bridges between the fender and the shield reshapes the end of each fender and hold it in such a manner as to conserve good docking for the fender on the geometrical module, and as to position it durably relative to the optical glasses and relative to the shield.

The hood lock, suitably positioned in the directions X and Y is connected in the direction Z to the top cross-member of the structural module which can thus take up the forces to which said lock is subjected and transmit them to the side rails of the vehicle.

Finally, the geometrical module is fixed to the vehicle body by being connected to the ends of the scuttle side reinforcements.

Naturally, the embodiments described above are not in any way limiting and can be modified in any desirable manner without thereby going beyond the ambit of the invention.

In particular, although the examples shown involve optical glasses only, it is clear that other optical elements such as entire light units or overglasses could be integrated in accordance with the invention with the geometrical portion of the equipment front face.

Similarly, the hood lock, present in all of the embodiments described, is not essential for implementing the invention as defined in claim 1.

Finally, it should be observed that the geometrical module may be made as a plurality of parts that are united with one another in such a manner as to readjust one of its dimensions, e.g. in the direction Y. Making such a module as a plurality of parts merely requires the addition of fastener means between said parts, but no particular constraints relating to mechanical strength are involved since the geometrical module does not perform any structural function for the vehicle.

What is claimed is:

1. A support for a shield and at least two optical elements, intended to be fixed on a motor vehicle in front of a structural part on which an impact beam is fixed, the support comprising:

a device to receive and fix at least two optical elements;

members to fix the shield;

docking zones to receive edges of a fender; and docking zones to receive edges of the shield and to position the edges of the shield relative to the edges of the fender and relative to the optical elements.

2. A support according to claim 1, including members to prop up the shield.

3. A support according to claim 1, in which the docking zones dock the shield with surrounding bodywork elements and are constituted by fender/shield pressers, and the docking zones acting between the shield and the optical elements carried by the support include a grille/shield fixing device and a prop for the top area of the shield.

4. A support according to claim 1, further comprising:

a device to position and fix a hood lock.

5. A support according to claim 1, including an appearance cross-member which masks a structural cross-member beneath the hood.

6. A support according to claim 1, including a top strength member to act as a bearing point for the shield in order to deal with pedestrian "thigh" impacts (or "child's head" impacts), and as a bearing point for the buttocks.

7. A support according to claim 1, including an impact absorber level with the impact beam in order to deal with "leg" impacts.

8. A support according to claim 1, including a low beam for dealing with "leg" impacts.

9. An equipment front face divided into two portions, namely a structural portion receiving functional members of the vehicle, and a geometrical portion constituted by a support according to claim 1.

10. An equipment front face according to claim 9, in which the structural portion complies with a geometrical reference of the bodywork in the vertical direction.

11. An equipment front face according to claim 10, in which the geometrical portion bears vertically on the structural portion, thereby imposing its positioning in the vertical direction, and is positioned in the longitudinal and transverse directions relative to a geometrical reference of the bodywork.

12. An equipment front face according to claim 9, in which the structural portion is arranged to be fixed on the vehicle body, at the ends of two side rails.

13. An equipment front face divided into two portions, namely a structural portion receiving functional members of the vehicle, and a geometrical portion constituted by a support comprising:

a device to receive and fix at least two optical elements;

members to fix a shield;

docking zones to receive edges of the shield and to position the edges relative to edges of adjacent fenders and relative to the optical elements;

wherein the support includes a device to position and fix a hood lock, and in which the geometrical portion and the structural portion in the vicinity of the lock include section members which, on being assembled together, form a hollow body which stiffens the equipment face in the region in which the lock is fixed.

14. An equipment front face according to claim 13, in which the geometrical portion is fixed to the body via the ends of scuttle side reinforcements, and by re-fixing the lock on the structural portion in the vertical direction.

15. An equipment front face according to claim 9, in which the structural portion includes a bottom flange which is fitted to the vehicle together with the other parts carried by the structural portion.

16. An equipment front face according to claim 9, having two hood lock plates each situated at the top end of a respective vertical leg fixed to one end of a side rail, and, together with other leg fixed to the other side rail constituting the only parts forming the structural portion.

17. A motor vehicle front block divided into two modules, namely a structural module integrating various functional members of the vehicle, and a geometrical module integrating the bodywork elements for the front of the vehicle.

18. A method of assembling parts on the equipment front face of the motor vehicle according to claim 9, a direction X indicating a longitudinal horizontal direction of the vehicle, a direction Y indicating a transverse horizontal direction of the vehicle, and a direction Z indicating a vertical direction, the method comprising:

fixing the structural portion of the equipment front face to a structure of the vehicle without positioning it precisely in the directions X and Y but complying with a geometrical reference of a bodywork in the direction Z; and then putting the geometrical portion of the equipment front face into position by bearing vertically on the structural portion which imposes its positioning in the direction Z thereon, the geometrical portion being positioned in the directions X and Y relative to a geometrical reference of the bodywork.

* * * * *